(12) United States Patent
Fuse

(10) Patent No.: US 6,493,655 B1
(45) Date of Patent: Dec. 10, 2002

(54) APPARATUS FOR MEASURING THROUGHPUT AND METHOD OF MEASURING THROUGHPUT

(75) Inventor: Motonari Fuse, Tokyo (JP)

(73) Assignee: NEC Corporation, Tokyo (JP)

( * ) Notice: Subject to any disclaimer, the term of this patent is extended or adjusted under 35 U.S.C. 154(b) by 190 days.

(21) Appl. No.: 09/599,392

(22) Filed: Jun. 23, 2000

(30) Foreign Application Priority Data

Jun. 25, 1999 (JP) .......................................... 11-180823

(51) Int. Cl.[7] ................................................ G06F 3/00
(52) U.S. Cl. ........................ 702/186; 702/182; 702/183
(58) Field of Search ................................. 702/182, 183, 702/186; 712/227; 714/47

(56) References Cited

U.S. PATENT DOCUMENTS

| | | | |
|---|---|---|---|
| 4,514,835 A | 4/1985 | Boettigheimer et al. | 368/118 |
| 5,504,894 A | 4/1996 | Ferguson et al. | 395/650 |
| 5,893,077 A * | 4/1999 | Griffin | 705/34 |
| 6,115,682 A * | 9/2000 | Omtzigt | 702/188 |

FOREIGN PATENT DOCUMENTS

| | | |
|---|---|---|
| JP | 49-70532 | 7/1974 |
| JP | 62-151949 | 7/1987 |
| JP | 1-98037 | 4/1989 |
| JP | 1-315837 | 12/1989 |
| JP | 2-244927 | 9/1990 |
| JP | 6-75782 A | 3/1994 |
| JP | 9-128274 | 5/1997 |
| JP | 9-282283 | 10/1997 |
| JP | 11102306 A | 4/1999 |

* cited by examiner

Primary Examiner—Marc S. Hoff
Assistant Examiner—Felix Suarez
(74) Attorney, Agent, or Firm—Foley & Lardner

(57) ABSTRACT

There is provided an apparatus for measuring a throughput in each of processes in a transaction processing system, wherein each of the processes has a processor carry out predetermined transaction processing. The apparatus includes (a) a counter counting the number of transaction processing carried out by the processor for each of the processes, (b) a measurement unit measuring a first period of time during which each of the processes make the processor operate for carrying out transaction processing, and (c) a data collector collecting both first data indicative of the number of transaction processing and second data indicative of the first period of time in each of the processes at predetermined time intervals.

74 Claims, 5 Drawing Sheets

APPARATUS FOR MEASURING THROUGHPUT AND METHOD OF MEASURING THROUGHPUT

BACKGROUND OF THE INVENTION

1. Field of the Invention

The invention relates to an apparatus of measuring a throughput of each of processes constituting a transaction processing system, and also to a method of doing the same.

2. Description of the Related Art

There have been suggested various apparatuses and methods of measuring a throughput of each of processes in a transaction processing system.

For instance, Japanese Unexamined Patent Publication No. 62-151949 has suggested an apparatus of measuring a throughput, comprising first means for transmitting a start command only while a command transmitted from central processing unit is being carried out, in response to an instruction transmitted from the central processing unit, second means for generating clock pulses on receipt of said start command in a predetermined period of time, third means for counting said clock pulses generated from second means, and fourth means for displaying the result of count carried out by third means, as a processing time of the central processing unit.

Japanese Unexamined Patent Publication No. 1-98037 has suggested a system for evaluating dynamic performance of a multi-task program, including (a) a plurality of transaction processors each of which is comprised of a task constituting a multi-task program, processes an input transaction, and activates a next transaction processor, (b) first means for generating input transactions at predetermined time intervals, (c) second means for having each one of the transaction processors carry out transaction processing in accordance with a transaction identifier of the input transaction generated by first means, (d) a transaction processing table storing therein the input transaction to be carried out by each one of the transaction processors, (e) a journal file storing journals of input transactions having been processed by said transaction processors, and (f) third means for retrieving the transaction processing table and the journal file to thereby transmit evaluation such as the number of input transactions not processed yet, and a period of time during which input transaction is processed.

Japanese Unexamined Patent Publication No. 1-315837 has suggested a transaction processing unit including a processing system to which a plurality of terminals are connected through lines, and which processes transaction received from the terminals, characterized by a load generator which generates pseud transaction similar to the transaction transmitted from each of the terminals, and inputs into the processing system.

Japanese Unexamined Patent Publication No. 2-244927 has suggested an apparatus for measuring a throughput, including at least one counter circuit electrically connected to an external terminal of a device to be measured, for measuring how a signal varies on the external terminal, a packet receiver monitoring packet data received by the device and introducing the packet data thereinto, and a processing unit for analyzing data received by the counter circuit and the packet receiver, and calculating a throughput of a data communication device.

Japanese Unexamined Patent Publication No. 9-128274 has suggested a method of grouping transaction, comprising the steps of extracting transaction data indicated with first job control language, from a journal file transmitted from an on-line processing system, and thereby making a transaction file storing data about operation of transaction, and extracting transaction indicated with second job control language in accordance with specific transaction, from the transaction file, and thereby grouping and collection the transaction in accordance with the specific transaction.

Japanese Unexamined Patent Publication No. 9-282283 has suggested a method of tracing on-line transaction in a computer which transaction is processed by at least one job task and includes multiplexing and decomposition during generation to termination of transaction. The method includes the steps of, when a transaction is requested for each of traces from the job task, outputting trace data including a time at which the request was made, an ID number of the requested job task, multiplexed transaction ID, a predetermined weigh coefficient assigned to each of multiplexed individual transaction Ids, and accumulating the data each time the transaction request is made.

The above-mentioned conventional apparatuses and methods of measuring a throughput of each processes constituting a transaction processing system are accompanied with the following problems.

For instance, the transaction system is comprised of a plurality of processes, and it is not possible to measure a throughput of each one of the processes. In other words, a throughput of each one of the processes was measured individually in atmosphere suitable for measuring each one of the processes. Hence, data was too insufficient to analyze the transaction system as a whole.

In addition, some of the above-mentioned conventional apparatuses have to be connected to an external terminal additionally provided with a device to be measured. Hence, it is unavoidable from the apparatus to become large in size.

SUMMARY OF THE INVENTION

In view of the above-mentioned problems in the conventional apparatuses and methods, it is an object of the present invention to provide an apparatus and a method both of which are capable of measuring a throughout in each one of processes.

In one aspect of the present invention, there is provided an apparatus for measuring a throughput in each of processes in a transaction processing system, each of the processes having a processor carry out predetermined transaction processing, the apparatus including (a) a counter counting the number of transaction processing carried out by the processor for each of the processes, and (b) a measurement unit measuring a first period of time during which each of the processes make the processor operate for carrying out transaction processing.

It is preferable that the transaction processing system is operable in a computer having UNIX operating system.

There is further provided an apparatus for measuring a throughput in each of processes in a transaction processing system, each of the processes having a processor carry out predetermined transaction processing, the apparatus including (a) a counter counting the number of transaction processing carried out by the processor for each of the processes, (b) a measurement unit measuring a first period of time during which each of the processes make the processor operate for carrying out transaction processing, and (c) a data collector collecting both first data indicative of the number of transaction processing and second data indicative of the first period of time in each of the processes at predetermined time intervals.

It is preferable that the data collector calculates a throughout X of each of the processes in accordance with the following equation:

$$X=B/A$$

wherein A indicates the number of transaction processing, and B indicates the first period of time.

It is preferable that the data collector calculates a rate Y at which each of the processes makes the processor carry out transaction processing, in accordance with the following equation:

$$Y=C/D$$

wherein C indicates a difference between a K-th period of time in which the processor is operated and a (K+1)-th period of time in which the processor is operated, the K-th and (K+1)-th period of times being measured at a predetermined time interval, wherein K is an integer equal to or greater than one, and D indicates the predetermined time interval.

It is preferable that the data collector identifies a bottleneck process among the processes in accordance with the throughput X.

It is preferable that the data collector identifies a bottleneck process among the processes in accordance with the rate Y.

It is preferable that the apparatus further includes a recording medium, and that the data collector stores both the first data and the second data, the throughput X, the rate Y, the bottleneck process in the recording medium.

It is preferable that the data collector collects both the first data and the second data in each of the processes at both a starting point and a terminating point in a period of time during which a throughput of each of the processes is measured.

It is preferable that the period of time is variable.

It is preferable that the data collector deems data obtained when a K-th period of time has passed, as data to be obtained when a (K+1)-th period starts.

In another aspect of the present invention, there is provided a transaction processing system including (a) at least one process for having a processor carry out predetermined transaction processing, (b) a counter counting the number of transaction processing carried out by the processor, and (c) a measurement unit measuring a first period of time during which the process makes the processor operate for carrying out transaction processing.

There is further provided a transaction processing system including (a) at least one process for having a processor carry out predetermined transaction processing, (b) a counter counting the number of transaction processing carried out by the processor, (c) a measurement unit measuring a first period of time during which the process makes the processor operate for carrying out transaction processing, and (d) a data collector collecting both first data indicative of the number of transaction processing and second data indicative of the first period of time at predetermined time intervals.

In still another aspect of the present invention, there is provided a method of measuring a throughput in each of processes in a transaction processing system, each of the processes having a processor carry out predetermined transaction processing, the method including the steps of (a) counting the number of transaction processing carried out by the processor for each of the processes, and (b) measuring a first period of time during which each of the processes make the processor operate for carrying out transaction processing.

There is further provided a method of measuring a throughput in each of processes in a transaction processing system, each of the processes having a processor carry out predetermined transaction processing, the method including the steps of (a) counting the number of transaction processing carried out by the processor for each of the processes, (b) measuring a first period of time during which each of the processes make the processor operate for carrying out transaction processing, and (c) collecting both first data indicative of the number of transaction processing and second data indicative of the first period of time in each of the processes at predetermined time intervals.

It is preferable that the method further includes the step of calculating a throughout X of each of the processes in accordance with the following equation:

$$X=B/A$$

wherein A indicates the number of transaction processing, and B indicates the first period of time.

It is preferable that the method further includes the step of a rate Y at which each of the processes makes the processor carry out transaction processing, in accordance with the following equation:

$$Y=C/D$$

wherein C indicates a difference between a K-th period of time in which the processor is operated and a (K+1)-th period of time in which the processor is operated, the K-th and (K+1)-th period of times being measured at a predetermined time interval, wherein K is an integer equal to or greater than one, and D indicates the predetermined time interval.

It is preferable that the method further includes the step of identifying a bottleneck process among the processes in accordance with the throughput X.

It is preferable that the method further includes the step of identifying a bottleneck process among the processes in accordance with the rate Y.

It is preferable that the method further includes the step of storing both the first and second data.

It is preferable that the method further includes the step of storing the throughput X.

It is preferable that the method further includes the step of storing the rate Y.

It is preferable that the method further includes the step of storing the bottleneck process.

It is preferable that the method further includes the step of storing the bottleneck process.

It is preferable that the first and second data is collected in the step (c) in each of the processes at both a starting point and a terminating point in a period of time during which a throughput of each of the processes is measured.

It is preferable that the method further includes the step of deeming data obtained when a K-th period of time has passed, as data to be obtained when a (K+1)-th period starts.

In yet another aspect of the present invention, there is provided a recording medium readable by a computer, storing a program therein for causing a computer to act as the above-mentioned apparatus for measuring a throughput in each of processes in a transaction processing system.

There is further provided a recording medium readable by a computer, storing a program therein for causing a computer to carry out the above-mentioned method of measuring a throughput in each of processes in a transaction processing system.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
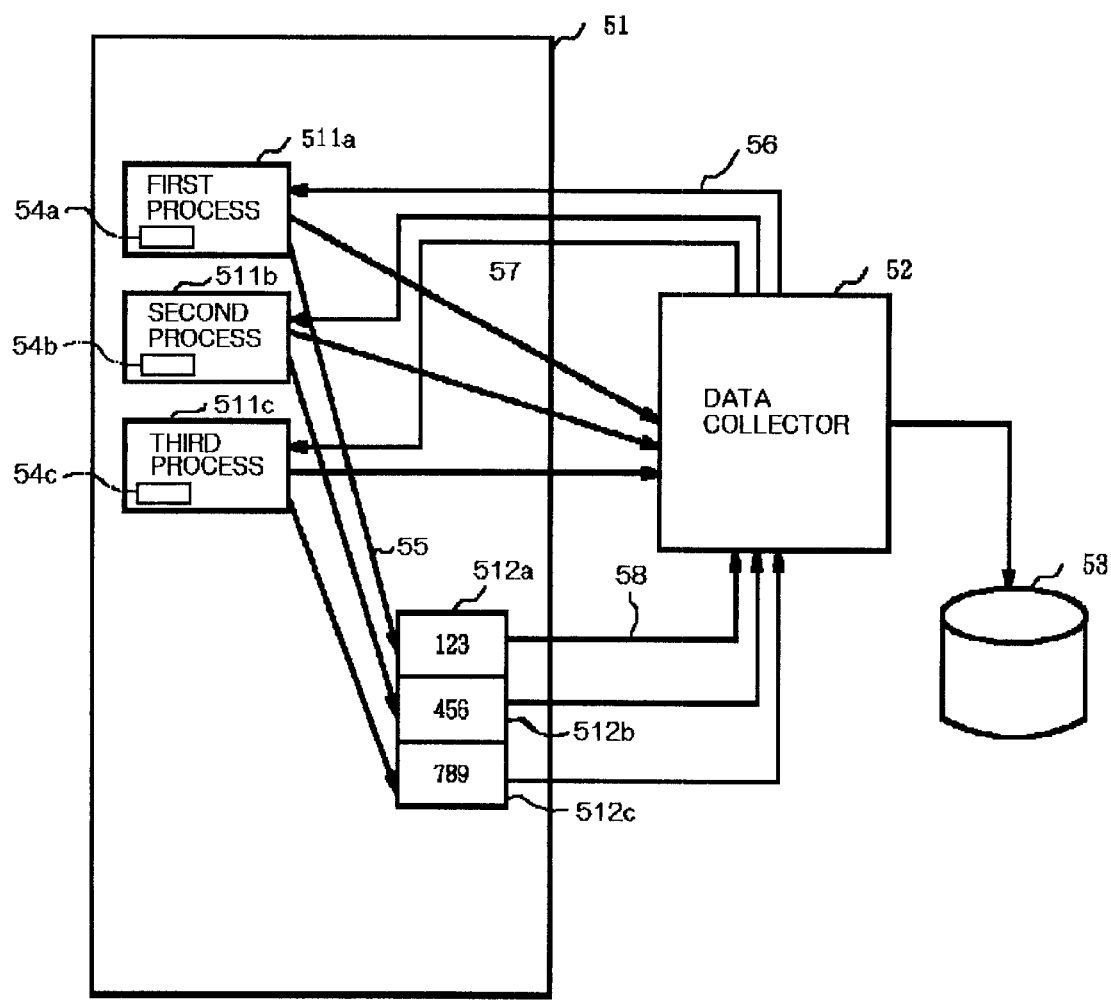
FIG. 1 is a block diagram of a transaction processing system in accordance with the first embodiment of the present invention.

FIG. 1 is a block diagram of a transaction processing system in accordance with the first embodiment of the present invention.

The illustrated transaction processing system 51 is designed to be able to operate in a computer having a UNIX operating system, and include first to third transaction processing processes 511a, 511b and 511c.

The transaction processing system 51 includes first to third counters 512a, 512b and 512c associated with the first to third transaction processing processes 511a, 511b and 511c, respectively. The first to third counters 512a, 512b and 512c count the number of transaction processing carried out by the first to third transaction processing processes 511a, 511b and 511c, respectively. Specifically, each time the first to third transaction processing processes 511a, 511b and 511c carry out the transaction processing, they transmit a first signal 55 to the first to third counters 512a, 512b and 512c. On receipt of the first signal 55, the first to third counters 512a, 512b and 512c count up the number of transaction processing.

Each of the first to third transaction processing processes 511a, 511b and 511c may be any process, unless it carries out predetermined transaction processing. For instance, each of the first to third transaction processing processes 511a, 511b and 511c may be a process for managing a link, a process for carrying out data conversion, or a process for carrying out any services.

Outside the transaction processing system 51 are a data collector 52 and a recording medium 53.

The first to third transaction processing processes 511a, 511b and 511c are designed to include first to third interfaces 54a, 54b and 54c, respectively. The first to third interfaces 54a, 54b and 54c receive a second signal 56 transmitted from the data collector 52 which second signal is indicative of an inquiry of how long time the first to third transaction processing processes 511a to 511c use a central processing unit (not illustrated), and transmits a third signal 57 to the data collector 52 which third signal is indicative of a first period of time during which the first to third processing processes 511a to 511c use the central processing unit, in response to the second signal 56.

The first period of time during which the first to third processing processes 511a to 511c use the central processing unit can be measured by virtue of a measurement function provided by UNIX operating system. The first period of time is always updated in a computer after the first to third transaction processing processes 511a to 511c, regardless of whether the measurement function is used or not. The first period of time can be measured by means of the first to third interfaces 54a to 54c which are called a system call.

The data collector 52 transmits the second signals 56 to the first to third transaction processing processes 511a to 511c, and receives the third signals 57 from the first to third transaction processing processes 511a to 511c in response.

The data collector 52 retrieves the first to third counters 512a to 512c to thereby have data indicative of the number of transaction processing. The data collector 52 stores the thus received data, that is, the third signals 57 indicative of the first period of time during which the first to third transaction processing processes 511a to 511c use the central processing unit and data indicative of the number of transaction processing, in the recording medium 53.

The number of transaction processing is not to be limited to a specific number. The number of transaction processing may be varied. For instance, the number of transaction processing may be 30,000 or 300,000.

Hereinbelow is explained an operation of the transaction processing system 51.

First, an operation of each of the first to third transaction processing processes 511a, 511b and 511c is explained with reference to FIGS. 2 and 3.

After having started, each of the first to third transaction processing processes 511a, 511b and 511c carries out initialization in step A1.

Then, each of the first to third transaction processing processes 511a, 511b and 511c receives a signal indicative of a request, in step A2.

Each of the first to third transaction processing processes 511a, 511b and 511c checks whether the received request is a request to finish carrying out transaction processing, in step A3.

If the received request is a request to finish carrying out transaction processing (YES in step A3), each of the first to third transaction processing processes 511a, 511b and 511c finishes carrying out transaction processing.

If the received request is a request other than the request to finish carrying out transaction processing (NO in step A3), each of the first to third transaction processing processes 511a, 511b and 511c carries out transaction processing in accordance with the received request, in step A4.

The above-mentioned steps A2 to A4 are repeated until each of the first to third transaction processing processes 511a, 511b and 511c finishes carrying out transaction processing in step A5.

Figure 2:
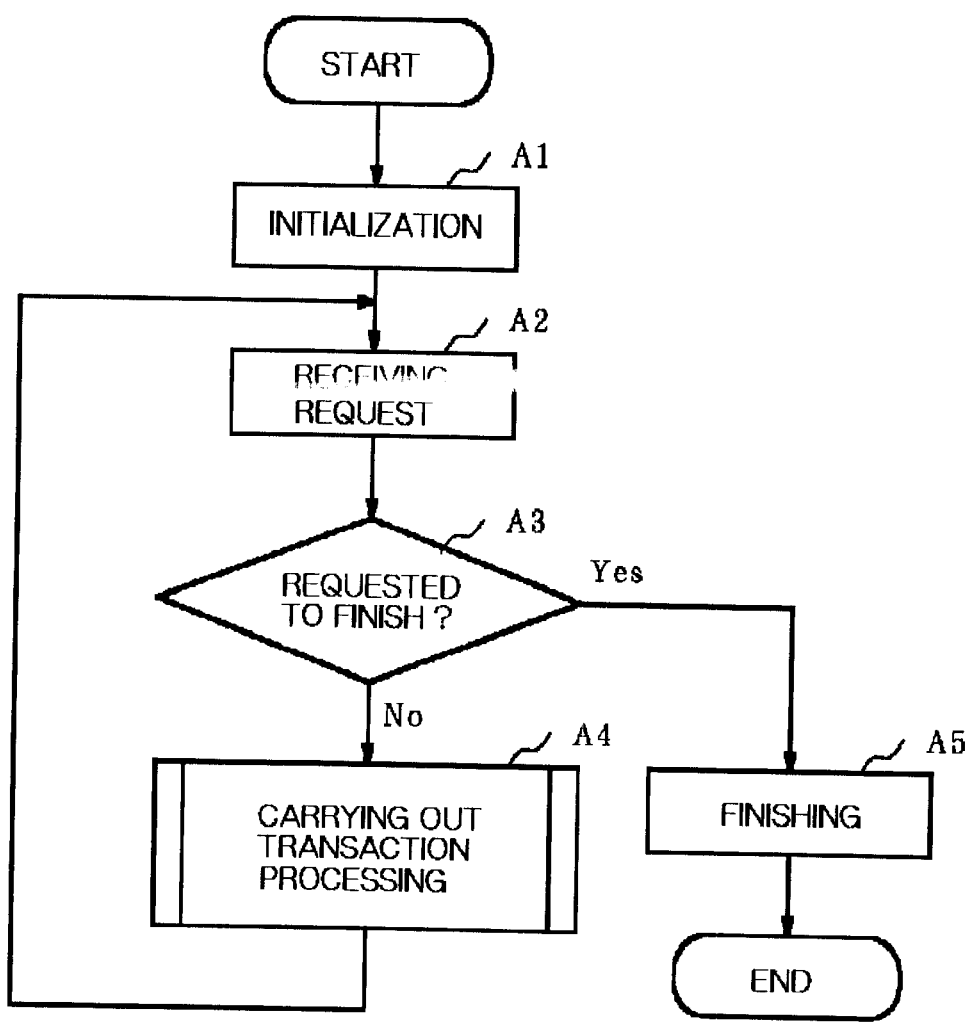
FIG. 2 is a flow chart showing an operation of each of transaction processing processes.
Figure 3:
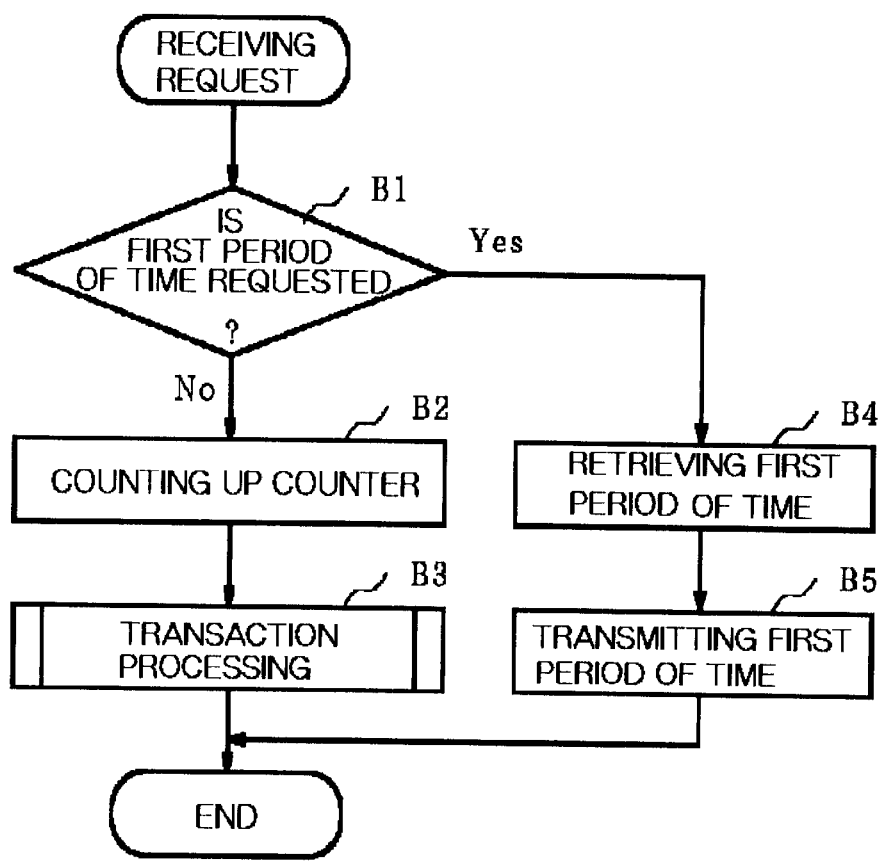
FIG. 3 is a flow chart showing an operation of each of transaction processing processes.

FIG. 3 is a flowchart of the transaction processing carried out in step A4 in FIG. 2.

When each of the first to third transaction processing processes 511a, 511b and 511c receive a request to carry out certain processing, each of the first to third transaction processing processes 511a, 511b and 511c checks whether the received request is a request to transmit the third signal 57 indicative of how long time each of the first to third transaction processing processes 511a, 511b and 511c uses the central processing unit, in step B1.

If the received request is a request other than the request to transmit the third signal 57 (NO in step B1), each of the first to third transaction processing processes 511a, 511b and 511c transmits the first signal 55 to the associated first to third counters 512a, 512b and 512c to thereby count up the number of transaction processing, in step B2.

The, each of the first to third transaction processing processes 611a, 511b and 511c carries out transaction processing in accordance with the received request. Herein, the first to third transaction processing processes 511a, 511b and 511c carry out different transaction processing from one another.

If the received request is a request to transmit the third signal 57 (YES in step B1), non-ordinary processing is carried out.

Specifically, each of the first to third transaction processing processes 511a, 511b and 511c retrieves the first period of time during which each of the first to third transaction processing processes 511a, 511b and 511c uses the central processing unit, in an operating system operated by the transaction processing system 51, in step B4.

Then, each of the first to third transaction processing processes 511a, 511b and 511c transmits the third signal 57 to the data collector, for instance, in step B5.

Hereinbelow is explained an operation of the data collector 52 with reference to FIGS. 4 and 5.

Figure 4:
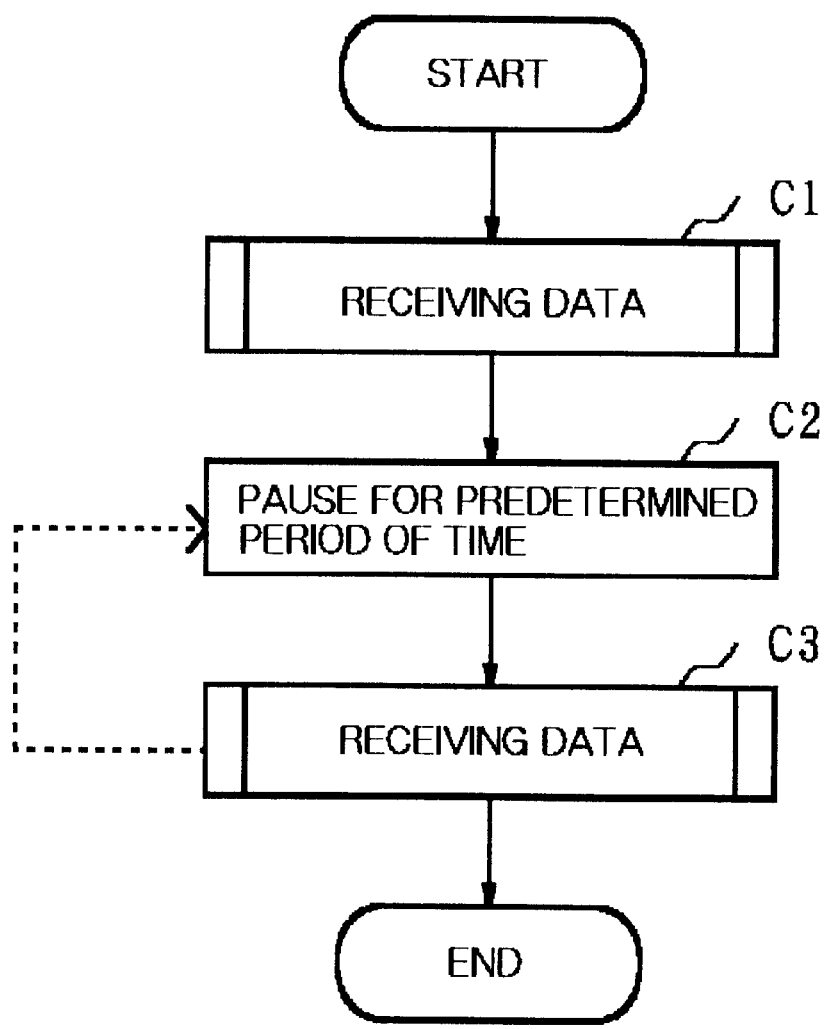
FIG. 4 is a flow chart showing an operation of the data collector.
Figure 5:
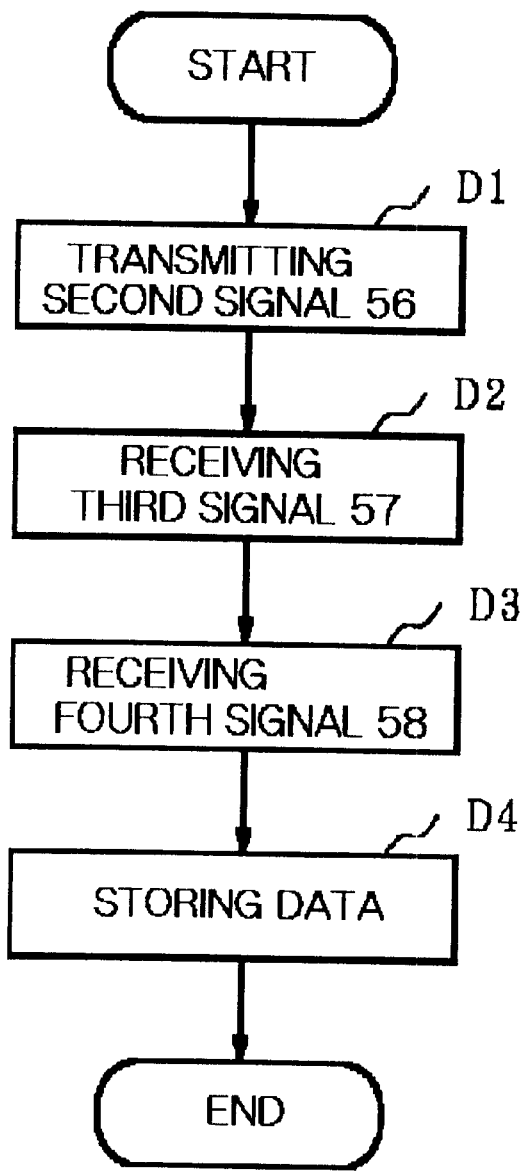
FIG. 5 is a flow chart showing an operation of the data collector.

With reference to FIG. 4, the data collector 52 carries out first data collection in step C1.

Then, the data collector 52 ceases data collection for a predetermined period of time, in step C2.

Then, the data collector 52 carries out second data collection, in step C3.

Namely, the data collector 52 carries out data collection at least twice, specifically, at starting and terminating points of the predetermined period of time.

The predetermined period of time during which the data collector 52 ceases data collection may be any period of time. For instance, it may be one minute, ten minutes or one hour.

The predetermined period of time is not to be limited to a fixed one. It may be variable. For instance, the predetermined period of time may be randomly varied within five to ten minutes, for instance.

The data collection carried out at steps C1 and C3 are identical with each other. The data collection is carried out as follows.

First, the data collector 52 transmits the second signals 56 to each of the first to third transaction processing processes 511a, 511b and 511c, in step D1. As mentioned earlier, the second signal 56 includes a request of transmitting the third signal 57 indicative of how long time each of the first to third transaction processing processes 511a, 511b and 511c uses the central processing unit.

In response to the second signals 56, the data collector 52 receives the third signals 57 from the third signals 57 from the first to third transaction processing processes 511a, 511b and 511c, in step D2.

Then, the data collector 52 receives fourth signals 58 indicative of the number of transaction processing having been carried out by each of the first to third transaction processing processes 511a, 511b and 511c, from the first to third counters 512a, 512b and 512c, in step D3.

Then, the data collector 52 stores the received data, that is, the third signals 57 indicative of how long time each of the first to third transaction processing processes 511a, 511b and 511c uses the central processing unit, and the fourth signals 58 indicative of the number of transaction processing having been carried out by each of the first to third transaction processing processes 511a, 511b and 511c, into the recording medium 53, in step D4.

A rate Y at which each of the first to third transaction processing processes 511a, 511b and 511c uses the central processing unit to thereby carry out transaction processing is defined as follows.

$$Y = C/D$$

In the equation, C indicates a difference between the first period of time (during which the process uses the central processing unit) measured at the starting point of the predetermined period of time in step C1 and the first period of time measured at the terminating point of the predetermined period of time in step C3, and D indicates the predetermined period of time defined as duration between steps C1 and C3.

The rate Y is theoretically within 0% to 100%, but is preferably as high as possible in order to reduce an error.

By comparing the rates Y of the first to third transaction processing processes 511a, 511b and 511c to one another, the data collector can identify a bottleneck process among the first to third transaction processing processes 511a, 511b and 511c.

In addition, the data collector 52 calculates a throughout X of each of the first to third transaction processing processes 511a, 511b and 511c in accordance with the following equation:

$$X = B/A.$$

In the equation, A indicates the number of transaction processing, and B indicates the first period of time during which each of the first to third transaction processing processes 511a, 511b and 511c uses the central processing unit.

In the above-mentioned embodiment, the data collector 52 repeats data collection at certain time intervals, as having been explained with reference to steps C1 to C3 in FIG. 4. As an alternative, the data collector 52 may be designed to repeat data collection without pause, in which case, data collected at a terminating point of a certain period of time is deemed as data to be collected at a starting point of a next period of time. This makes it possible to successively measure the throughout X of each of the first to third transaction processing processes 511a, 511b and 511c.

In accordance with the first embodiment, since each of the first to third transaction processing processes 511a, 511b and 511c is designed to include the first to third interfaces 54a to 54c, respectively, which transmit the third signals 57 indicative of the first period of time during which each of the first to third transaction processing processes 511a, 511b and 511c uses the central processing unit, it is possible to concurrently measure the throughput X of each of the first to third transaction processing processes 511a, 511b and 511c and a throughput of the transaction processing system 51.

In addition, since the throughput X of each of the first to third transaction processing processes 511a, 511b and 511c can be concurrently measured, it is also possible to identify a bottleneck process among the first to third transaction processing processes 511a, 511b and 511c.

Furthermore, the first to third transaction processing processes 511a, 511b and 511c can be readily equipped with a device for measuring the first period of time. If such a device is incorporated into the first to third transaction processing processes 511a, 511b and 511c, services supplied by the first to third transaction processing processes 511a, 511b and 511c are not degraded. Hence, it is possible to measure the first period of time even while the transaction processing system 51 is in operation for supplying services.

This is because since UNIX operating system always updates basic data such as the first period of time, the function of measuring the first period of time has to additionally measure the first period of time at the starting and terminating points, as shown in FIG. 4. Accordingly, extra overhead does not occur while the transaction processing system 51 is in operation, which ensures that services supplied by the first to third transaction processing processes 511a, 511b and 511c are not degraded.

In the above-mentioned embodiment, the transaction processing system 51 is designed to include the first to third transaction processing processes 511a, 511b and 511c and the associated first to third counters 512a, 512b and 512c. However, it should be note that the first to third counters 512a, 512b and 512c may be provided separately from the transaction processing system 51. As an alternative, the transaction processing system 51 may be designed to include not only the first to third transaction processing processes 511a, 511b and 512c and the associated first to third counters 512a, 512b and 512c, but also the data collector 52 and the recording medium 53.

Hereinbelow is explained an embodiment of a recording medium storing a program therein for accomplishing the above-mentioned transaction processing system 51.

A recording medium storing a program for accomplishing the above-mentioned transaction processing system 51 may be accomplished by programming functions of the above-mentioned system with a programming language readable by a computer, and recording the program in a recording medium such as CD-ROM, a floppy disc, a magnetic tape, and any other suitable means for storing a program therein.

A hard disc equipped in a server may be employed as a recording medium. It is also possible to accomplish the recording medium in accordance with the present invention by storing the above-mentioned computer program in such a recording medium as mentioned above, and reading the computer program by other computers through a network.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-180823 filed on Jun. 25, 1999 including specification, claims, drawings and summary is incorporated herein by reference in its entirety.

What is claimed is:

1. An apparatus for measuring a throughput in each of processes in a transaction processing system, each of said processes having a processor carry out predetermined transaction processing, said apparatus comprising:
  (a) a counter counting the number of transaction processing carried out by said processor for each of said processes; and
  (b) a measurement unit measuring a first period of time during which each of said processes makes said processor operate for carrying out transaction processing.

2. The apparatus as set forth in claim 1, wherein said transaction processing system is operable in a computer having UNIX operating system.

3. An apparatus for measuring a throughput in each of processes in a transaction processing system, each of said processes having a processor carry out predetermined transaction processing, said apparatus comprising:
  (a) a counter counting the number of transaction processing carried out by said processor for each of said processes;
  (b) a measurement unit measuring a first period of time during which each of said processes make said processor operate for carrying out transaction processing; and
  (c) a data collector collecting both first data indicative of said number of transaction processing and second data indicative of said first period of time in each of said processes at predetermined time intervals.

4. The apparatus as set forth in claim 3, wherein said data collector calculates a throughput X of each of said processes in accordance with the following equation:

$$X=B/A$$

wherein A indicates said number of transaction processing, and B indicates said first period of time.

5. The apparatus as set forth in claim 3, wherein said data collector calculates a rate Y at which each of said processes makes said processor carry out transaction processing, in accordance with the following equation:

$$Y=C/D$$

wherein C indicates a difference between a K-th period of time in which said processor is operated and a (K+1)-th period of time in which said processor is operated, said K-th and (K+1)-th period of times being measured at a predetermined time interval, wherein K is an integer equal to or greater than one, and D indicates said predetermined time interval.

6. The apparatus as set forth in claim 4, wherein said data collector identifies a bottleneck process among said processes in accordance with said throughput X.

7. The apparatus as set forth in claim 5, wherein said data collector identifies a bottleneck process among said processes in accordance with said rate Y.

8. The apparatus as set forth in claim 3, further comprising a recording medium, and wherein said data collector stores both said first data and said second data in said recording medium.

9. The apparatus as set forth in claim 4, further comprising a recording medium, and wherein said data collector stores said throughput X in said recording medium.

10. The apparatus as set forth in claim 5, further comprising a recording medium, and wherein said data collector stores said rate Y in said recording medium.

11. The apparatus as set forth in claim 6, further comprising a recording medium, and wherein said data collector stores said bottleneck process in said recording medium.

12. The apparatus as set forth in claim 7, further comprising a recording medium, and wherein said data collector stores said bottleneck process in said recording medium.

13. The apparatus as set forth in claim 3, wherein said data collector collects both said first data and said second data in each of said processes at both a starting point and a terminating point in a period of time during which a throughput of each of said processes is measured.

14. The apparatus as set forth in claim 13, wherein said period of time is variable.

15. The apparatus as set forth in claim 3, wherein said data collector deems data obtained when a K-th period of time has passed, as data to be obtained when a (K+1)-th period starts.

16. The apparatus as set forth in claim 15, further comprising a recording medium, and wherein said data collector stores both said first data and second data in said recording medium.

17. The apparatus as set forth in claim 3, wherein said transaction processing system is operable in a computer having UNIX operating system.

18. A transaction processing system comprising:
   (a) at least one process for having a processor carry out predetermined transaction processing;
   (b) a counter counting the number of transaction processing carried out by said processor; and
   (c) a measurement unit measuring a first period of time during which said process makes said processor operate for carrying out transaction processing.

19. The transaction processing system as set forth in claim 18, wherein said transaction processing system is operable in a computer having UNIX operating system.

20. A transaction processing system comprising:
   (a) at least one process for having a processor carry out predetermined transaction processing;
   (b) a counter counting the number of transaction processing carried out by said processor;
   (c) a measurement unit measuring a first period of time during which said process makes said processor operate for carrying out transaction processing; and
   (d) a data collector collecting both first data indicative of said number of transaction processing and second data indicative of said first period of time at predetermined time intervals.

21. The transaction processing system as set forth in claim 20, wherein said data collector calculates a throughput X of said process in accordance with the following equation:

$$X=B/A$$

Wherein A indicates said number of transaction processing, and B indicates said first period of time.

22. The transaction processing system as set forth in claim 20, wherein said data collector calculates a rate Y at which said process makes said processor carry out transaction processing, in accordance with the following equation:

$$Y=C/D$$

wherein C indicates a difference between a K-th period of time in which said processor is operated and a (K+1)-th period of time in which said processor is operated, said K-th and (K+1)-th period of times being measured at a predetermined time interval, wherein K is an integer equal to or greater than one, and D indicates said predetermined time interval.

23. The transaction processing system as set forth in claim 21, wherein said transaction processing system includes a plurality of processes, and wherein said data collector identifies a bottleneck process among said processes in accordance with said throughput X.

24. The transaction processing system as set forth in claim 22, wherein said transaction processing system includes a plurality of processes, and wherein said data collector identifies a bottleneck process among said processes in accordance with said rate Y.

25. The transaction processing system as set forth in claim 20, further comprising a recording medium, and wherein said data collector stores both said first data and said second data in said recording medium.

26. The transaction processing system as set forth in claim 21, further comprising a recording medium, and wherein said data collector stores said throughput X in said recording medium.

27. The transaction processing system as set forth in claim 22, further comprising a recording medium, and wherein said data collector stores said rate Y in said recording medium.

28. The transaction processing system as set forth in claim 23, further comprising a recording medium, and wherein said data collector stores said bottleneck process in said recording medium.

29. The transaction processing system as set forth in claim 24, further comprising a recording medium, and wherein said data collector stores said bottleneck process in said recording medium.

30. The transaction processing system as set forth in claim 20, wherein said data collector collects both said number of transaction processing and said first period of time at both a starting point and a terminating point in a period of time during which a throughput of said process is measured.

31. The transaction processing system as set forth in claim 30, wherein said period of time is variable.

32. The transaction processing system as set forth in claim 20, wherein said data collector deems data obtained when a K-th period of time has passed, as data to be obtained when a (K+1)-th period starts.

33. A method of measuring a throughput in each of processes in a transaction processing system, each of said processes having a processor carry out predetermined transaction processing, said method comprising the steps of:
   (a) counting the number of transaction processing carried out by said processor for each of said processes; and
   (b) measuring a first period of time during which each of said processes make said processor operate for carrying out transaction processing.

34. A method of measuring a throughput in each of processes in a transaction processing system, each of said processes having a processor carry out predetermined transaction processing, said method comprising the steps of:
   (a) counting the number of transaction processing carried out by said processor for each of said processes;
   (b) measuring a first period of time during which each of said processes make said processor operate for carrying out transaction processing; and
   (c) collecting both first data indicative of said number of transaction processing and second data indicative of said first period of time in each of said processes at predetermined time intervals.

35. The method as set forth in claim 34, further comprising the step of calculating a throughput X of each of said processes in accordance with the following equation:

$$X=B/A$$

wherein A indicates said number of transaction processing, and B indicates said first period of time.

36. The method as set forth in claim 34, further comprising the step of a rate Y at which each of said processes makes said processor carry out transaction processing, in accordance with the following equation:

$$Y=C/D$$

wherein C indicates a difference between a K-th period of time in which said processor is operated and a (K+1)-th period of time in which said processor is operated, said K-th and (K+1)-th period of times being measured at a predetermined time interval, wherein K is an integer equal to or greater than one, and D indicates said predetermined time interval.

37. The method as set forth in claim 35, further comprising the step of identifying a bottleneck process among said processes in accordance with said throughput X.

38. The method as set forth in claim 36, further comprising the step of identifying a bottleneck process among said processes in accordance with said rate Y.

39. The method as set forth in claim 34, further comprising the step of storing both said first and second data.

40. The method as set forth in claim 35, further comprising the step of storing said throughput X.

41. The method as set forth in claim 36, further comprising the step of storing said rate Y.

42. The method as set forth in claim 37, further comprising the step of storing said bottleneck process.

43. The method as set forth in claim 38, further comprising the step of storing said bottleneck process.

44. The method as set forth in claim 34, wherein said first and second data is collected in said step (c) in each of said processes at both a starting point and a terminating point in a period of time during which a throughput of each of said processes is measured.

45. The method as set forth in claim 34, further comprising the step of deeming data obtained when a K-th period of time has passed, as data to be obtained when a (K+1)-th period starts.

46. A recording medium readable by a computer, storing a program therein for causing a computer to act as an apparatus for measuring a throughput in each of processes in a transaction processing system, each of said processes having a processor carry out predetermined transaction processing, said apparatus comprising:

(a) a counter counting the number of transaction processing carried out by said processor for each of said processes; and (b) a measurement unit measuring a first period of time during which each of said processes makes said processor operate for carrying out transaction processing.

47. The recording medium as set forth in claim 46, wherein said transaction processing system is operable in a computer having UNIX operating system.

48. An recording medium readable by a computer, storing a program therein for causing a computer to act as an apparatus for measuring a throughput in each of processes in a transaction processing system, each of said processes having a processor carry out predetermined transaction processing, said apparatus comprising:

(a) a counter counting the number of transaction processing carried out by said processor for each of said processes;

(b) a measurement unit measuring a first period of time during which each of said processes make said processor operate for carrying out transaction processing; and (c) a data collector collecting both first data indicative of said number of transaction processing and second data indicative of said first period of time in each of said processes at predetermined time intervals.

49. The recording medium as set forth in claim 48, wherein said data collector calculates a throughput X of each of said processes in accordance with the following equation:

$$X=B/A$$

wherein A indicates said number of transaction processing, and B indicates said first period of time.

50. The recording medium as set forth in claim 48, wherein said data collector calculates a rate Y at which each of said processes makes said processor carry out transaction processing, in accordance with the following equation:

$$Y=C/D$$

wherein C indicates a difference between a K-th period of time in which said processor is operated and a (K+1)-th period of time in which said processor is operated, said K-th and (K+1)-th period of times being measured at a predetermined time interval, wherein K is an integer equal to or greater than one, and D indicates said predetermined time interval.

51. The recording medium as set forth in claim 49, wherein said data collector identifies a bottleneck process among said processes in accordance with said throughput X.

52. The recording medium as set forth in claim 50, wherein said data collector identifies a bottleneck process among said processes in accordance with said rate Y.

53. The recording medium as set forth in claim 48, further comprising a recording medium, and wherein said data collector stores both said first data and said second data in said recording medium.

54. The recording medium as set forth in claim 49, further comprising a recording medium, and wherein said data collector stores said throughput X in said recording medium.

55. The recording medium as set forth in claim 50, further comprising a recording medium, and wherein said data collector stores said rate Y in said recording medium.

56. The recording medium as set forth in claim 51, further comprising a recording medium, and wherein said data collector stores said bottleneck process in said recording medium.

57. The recording medium as set forth in claim 52, further comprising a recording medium, and wherein said data collector stores said bottleneck process in said recording medium.

58. The recording medium as set forth in claim 48, where in s aid data collector collects both said first data and said second data in each of said processes at both a starting point and a terminating point in a period of time during which a throughput of each of said processes is measured.

59. The recording medium as set forth in claim 58, wherein said period of time is variable.

60. The recording medium as set forth in claim 48, wherein said data collector deems data obtained when a K-th period of time has passed, as data to be obtained when a (K+1)-th period starts.

61. The recording medium as set forth in claim 48, wherein said transaction processing system is operable in a computer having UNIX operating system.

62. A recording medium readable by a computer, storing a program therein for causing a computer to carry out a method of measuring a throughput in each of processes in a transaction processing system, each of said processes having a processor carry out predetermined transaction processing, said method comprising the steps of:

(a) counting the number of transaction processing carried out by said processor for each of said processes; and (b) measuring a first period of time during which each of said processes make said processor operate for carrying out transaction processing.

63. A recording medium readable by a computer, storing a program therein for causing a computer to carry out a method of measuring a throughput in each of processes in a transaction processing system, each of said processes having a processor carry out predetermined transaction processing, said method comprising the steps of:

(a) counting the number of transaction processing carried out by said processor for each of said processes;

(b) measuring a first period of time during which each of said processes make said processor operate for carrying out transaction processing; and (c) collecting both first data indicative of said number of transaction processing and second data indicative of said first period of time in each of said processes at predetermined time intervals.

64. The recording medium as set-forth in claim 63, wherein said method further includes the step of calculating a throughput X of each of said processes in accordance with the following equation:

$$X=B/A$$

wherein A indicates said number of transaction procession, and B indicates said first period of time.

65. The recording medium as set forth in claim 63, wherein said method further includes the step of a rate Y at which each of said processes makes said processor carry out transaction processing, in accordance with the following equation:

$$Y=C/D$$

wherein C indicates a difference between a K-th period of time in which said processor is operated and a (K+1)-th period of time in which said processor is operated, said K-th and (K+1)-th period of times being measured at a predetermined time interval, wherein K is an integer equal to or greater than one, and D indicates said predetermined time interval.

66. The recording medium as set forth in claim 64, wherein said method further includes the step of identifying a bottleneck process among said processes in accordance with said throughput X.

67. The recording medium as set forth in claim 65, wherein said method further includes the step of identifying a bottleneck process among said processes in accordance with said rate Y.

68. The recording medium as set forth in claim 63, wherein said method further includes the step of storing both said first and second data.

69. The recording medium as set forth in claim 64, wherein said method further includes the step of storing said throughput X.

70. The recording medium as set forth in claim 65, wherein said method further includes the step of storing said rate Y.

71. The recording medium as set forth in claim 66, wherein said method further includes the step of storing said bottleneck process.

72. The recording medium as set forth in claim 67, wherein said method further includes the step of storing said bottleneck process.

73. The recording medium as set forth in claim 63, wherein said first and second data is collected in said step (c) in each of said processes at both a starting point and a terminating point in a period of time during which a throughput of each of said processes is measured.

74. The recording medium as set forth in claim 63, wherein said method further includes the step of deeming data obtained when a K-th period of time has passed, as data to be obtained when a (K+1)-th period starts.

* * * * *